(12) United States Patent
Kojima (10) Patent No.: US 6,406,226 B2
(45) Date of Patent: Jun. 18, 2002

(54) THROWAWAY TIP AND DRILL HOLDER (75) Inventor: Yoshihide Kojima, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/819,422

(22) Filed: Mar. 27, 2001

(30) Foreign Application Priority Data

Mar. 31, 2000 (JP) .................................. 2000-099539

(51) Int. Cl.7 ............................................. B23B 51/02
(52) U.S. Cl. ...................... 408/223; 408/230; 408/233; 408/713
(58) Field of Search ..................... 408/57, 59, 144, 408/226, 228, 223, 224, 227, 229, 230, 231, 233, 713

(56) References Cited

U.S. PATENT DOCUMENTS 2,237,901 A * 4/1941 Chun .......................... 408/233
3,333,489 A * 8/1967 Mossberg ................... 408/233
4,744,704 A * 5/1988 Galvefors ................... 408/230
5,338,135 A * 8/1994 Noguchi et al. ............ 408/233
5,649,794 A * 7/1997 Kress et al. ................ 408/233

FOREIGN PATENT DOCUMENTS

| JP | 10-29108 | 2/1998 |
| JP | 10-328918 | 12/1998 |
| JP | 11-188518 | 7/1999 |

* cited by examiner

Primary Examiner—Daniel W. Howell
(74) Attorney, Agent, or Firm—Hogan & Hartson, L.L.P.

(57) ABSTRACT

The present invention relates to a throwaway tip of single tip type having an inner cutting edge for cutting a center area of a hole being drilled and an outer cutting edge for cutting a circumference area of the hole, and to a drill holder for holding the throwaway tip. The tip is characterized in that a step gap between a first rake face and a second bearing face on the side of the inner cutting edge are spanned by a first curved surface, and the drill holder is characterized in that a connection surface thereof adjacent to the first rake face is inclined in the same direction as an inclination of the helix of a flute, whereby chip ejection is facilitated.

11 Claims, 8 Drawing Sheets

THROWAWAY TIP AND DRILL HOLDER

CROSS REFERENCE TO RELATED APPLICATION

This application claims priority benefits under 35 USC § 119 on the basis of Japanese Patent Application No. 2000-99539, the disclosure thereof being incorporated herein by reference.

BACKGROUND OF THE INVENTION

The present invention relates to a throwaway tip for drilling. The invention further relates to a drill holder for holding such a throwaway tip at a front end thereof.

Drills for drilling a workpiece such as of a metal include: solid type drills which have a unitary drill structure; and throwaway-tipped drills which have a drill holder, and a throwaway tip having a cutting edge and adapted to be removably attached to a front end of the drill holder.

The throwaway-tipped drills are classified into a double tip type and a single tip type.

A throwaway-tipped drill of the double tip type has two tips including an inner cutting tip which has an inner cutting edge for cutting a center area of a hole being drilled, and an outer cutting tip which has an outer cutting edge for cutting a circumference area of the hole, the two tips being attached to a front end of a drill holder (Japanese Laid-Open Patent Publication JP 10-29108A(1998)).

The construction of the double tip type is suitable for a larger-size drill having a greater drilling diameter. However, it is difficult to apply this construction to a smaller-size drill having a drilling diameter of smaller than $\phi 10$ for the following reasons.

It is difficult to provide a space sufficient to accommodate the two tips attached to the front end of the holder.

Further, it is difficult to provide a space for smooth ejection of chips generated by cutting a workpiece with the inner cutting edge and the outer cutting edge of the tip.

Since screws for fixing the tips to the holder are very small in size, a sufficient fixing strength cannot be ensured.

Therefore, the smaller-size drill mainly employs the construction of the single tip type.

Figure 8A:
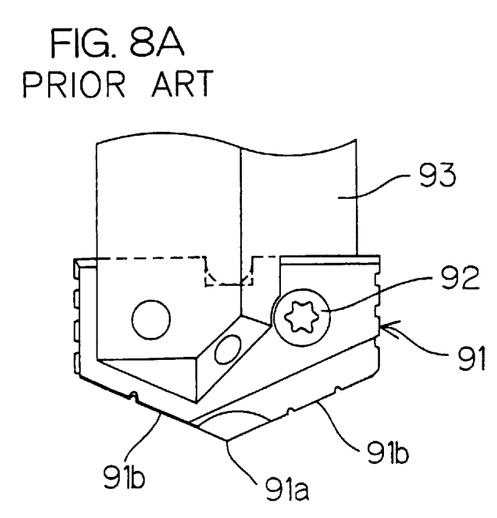
FIG. 8A is a plan view illustrating a front end portion of a conventional throwaway-tipped drill of a single tip type.
Figure 8B:
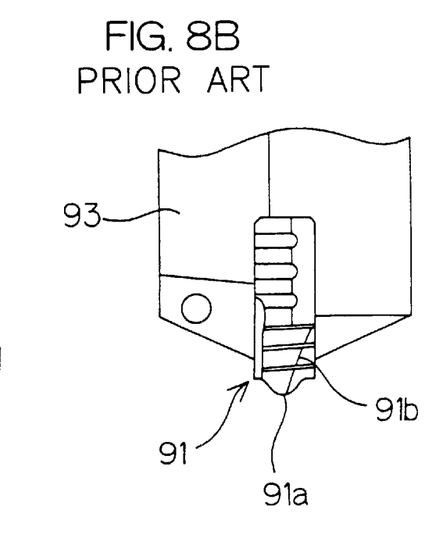
FIG. 8B is a side view of the front end portion of the drill.
Figure 8C:
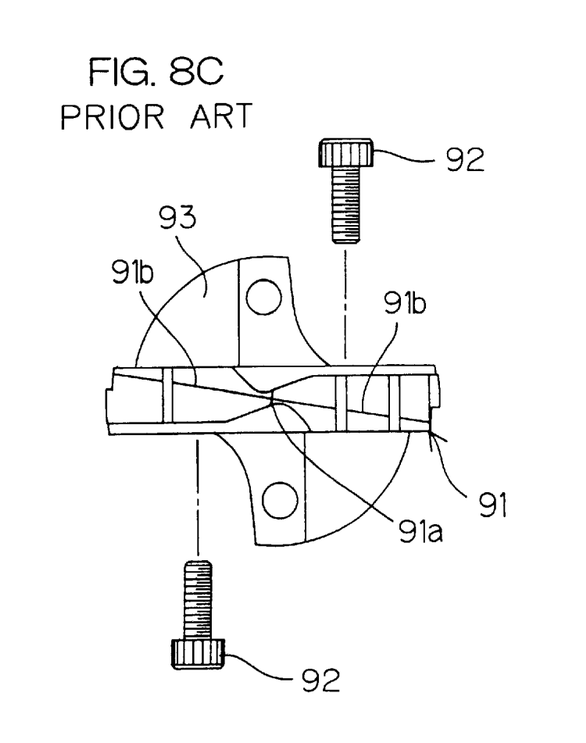
FIG. 8C is a bottom view of the front end portion of the drill facing in the drilling direction.

The throwaway-tipped drill of the single tip type generally employs a tip having a similar tip shape to the conventional solid type drill. More specifically, a tip 91 is employed which has a pair of long cutting ridges 91*b*, 91*b* each extending from a tip point 91*a* positioned on a rotation axis of the drill across the entire radius of a hole being drilled as shown in FIGS. 8A to 8C (Japanese Laid-Open Patent Publication JP 10-328918A(1998)).

However, the cutting ridges 91*b*, 91*b* of the tip 91 each have a great length, so that the tip 91 is subjected to a great cutting resistance during drilling. Therefore, it is necessary to firmly fix the single tip 91 to a front end of a holder 93 with two screws 92, 92. Further, the tip 91 needs to have a greater thickness. This makes it difficult to provide a space for ejecting chips from the hole.

The inventor of the present invention previously developed a throwaway tip of the single tip type having a similar front portion shape to that of the throwaway-tipped drill of the double tip type (Japanese Laid-Open Patent Publication JP 11-188518A(1999)). This throwaway tip has an inner cutting edge and an outer cutting edge which are respectively modeled after the inner cutting edge of the inner cutting tip and the outer cutting edge of the outer cutting tip of the throwaway-tipped drill of the double tip type and formed integrally on the single tip.

The inner cutting edge of the throwaway tip is merely required to have a length sufficient to cut a center area of a hole being drilled. Similarly, the outer cutting edge is merely required to have a length sufficient to cut a circumference area of the hole. Therefore, the lengths of the inner cutting edge and the outer cutting edge can be reduced as compared with the cutting ridges of the conventional single tip type drill which each extend across the entire radius of the hole, so that the cutting resistance exerted on the tip during drilling can be reduced. As a result, the thicknesses of the inner cutting edge and the outer cutting edge of the tip can be reduced, and the tip can be fixed to a holder with a single screw. Further, a sufficient space can be provided for ejecting chips from the hole.

The inventor has recently conducted studies on the throwaway tip and the drill holder to be employed in combination with the throwaway tip. As a result, the inventors have found that the constructions described in the aforesaid publications need further improvement in the function thereof, particularly, for smoothly ejecting the chips from the hole.

SUMMARY OF THE INVENTION

It is an object of the present invention to provide a novel throwaway tip which allows for easier chip ejection than the prior art. It is another object of the invention to provide a novel drill holder for a throwaway tip which allows for easier chip ejection than the prior art.

In accordance with an inventive aspect of claim 1, there is provided a throwaway tip for drilling a hole, which comprises: an inner cutting edge provided at a front end of a drill direction of the tip for cutting a center area of the hole; an outer cutting edge provided at the front end of the tip for cutting a circumference area of the hole; a first rake face provided on one side of the tip; a first bearing face provided on the other side of the tip in a back-to-back relation with the first rake face; a first front flank provided on the front end of the tip as intersecting the first rake face and the first bearing face; the inner cutting edge being defined as a ridge by an intersection between the first rake face and the first front flank and extending as crossing the drilling direction; a second rake face provided on the other side of the tip; a second bearing face provided on the one side of the tip in a back-to-back relation with the second rake face; and a second front flank provided on the front end as intersecting the second rake face and the second bearing face; the outer cutting edge being defined as a ridge by an intersection between the second rake face and the second front flank and extending as crossing the drilling direction; the first rake face being located at a lower level than the second bearing face on one side of the tip, and connected to the second bearing face by a first curved surface for guiding chips generated by cutting with the inner cutting edge.

Conventionally, the inventor has designed a tip so that a greater chip ejection space can be provided on the side of the inner cutting edge than on the side of the outer cutting edge for ejecting chips generated on the side of the inner cutting edge as smoothly as possible. This is because chips generated on the side of the inner cutting edge and on the side of the outer cutting edge are different in shape and, hence, are ejected through different chip ejection mechanisms.

Figure 4A:
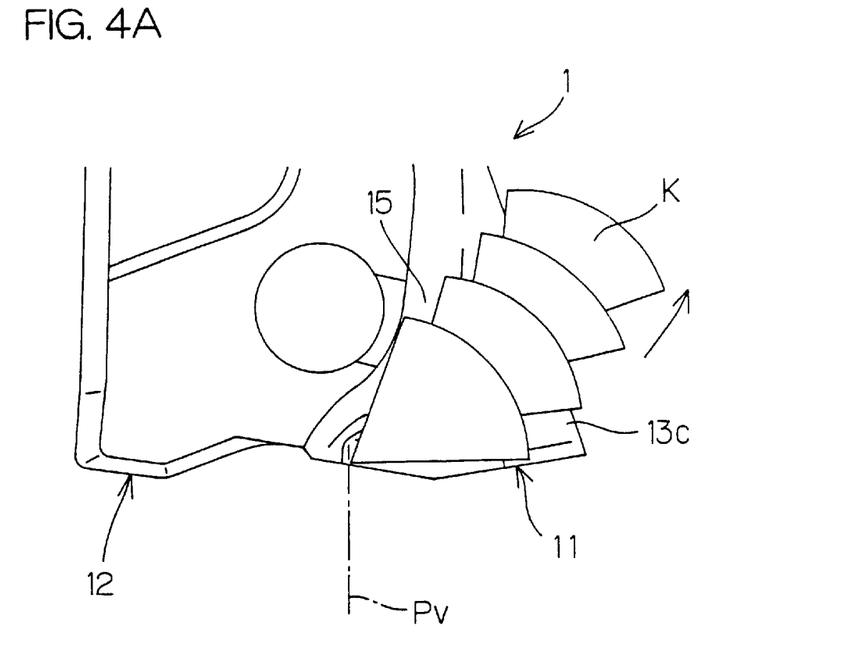
FIG. 4A is a front view illustrating an exemplary shape of a chip generated by an inner cutting edge of the tip.

For example, a chip K generated when a portion of a workpiece around the center of a hole being drilled along the rotation axis Pv of a drill is cut with the inner cutting edge 11 is in a three-dimensional helical shape such that cones, of which apex corresponds to a center of the hole, are stacked one on another as shown in FIG. 4A. This is because a rate at which the workpiece is cut with the inner cutting edge is zero at the center of the hole and increases as a radial distance from the center increases. In order to smoothly eject the chip K of such a complicated three-dimensional shape from the hole, it is necessary to keep the chip continuous with least discontinuity. The continuous chip K without discontinuity gradually grows in a direction indicated by a solid line arrow in the figure as the drilling proceeds, and is automatically and continuously carried away from the hole through a flute of the holder.

On the contrary, a chip generated when a relatively small portion of the workpiece which corresponds to a circumference area of the hole is cut with the outer cutting edge is in the shape of a strip having a given width or segments of the strip. This is because the outer cutting edge does not produce so great a difference in cutting rate between an axial side and a circumferential side in a circular locus thereof during rotation as the inner cutting edge does. The chips generated on the side of the outer cutting edge are more easily ejected than the chips generated on the side of the inner cutting edge.

Therefore, the inventor considered that, in order to smoothly eject the chips of the complicated three-dimensional shape on the side of the inner cutting edge, the chip ejection space provided on the side of the inner cutting edge desirably has a greater size than the space provided on the side of the outer cutting edge for the ejection of the fine chips.

However, studies thereafter conducted by the inventor revealed that the provision of the greater space alone produces a limited effect on the smooth chip ejection on the side of the inner cutting edge. This indicated that there are limitations on further increase in the rotation speed of the drill and, hence, on increase in the drilling rate.

Therefore, the inventor contemplated a design such that a middle portion of the tip serving for the chip ejection on the side of the inner cutting edge is configured to be suitable for guiding and ejecting the chips of the complicated three-dimensional shape.

Figure 1A:
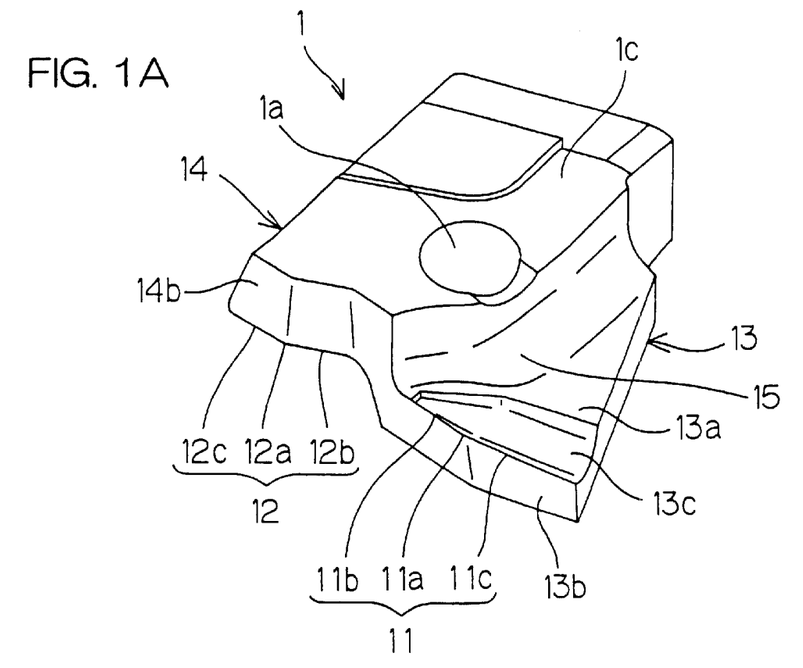
FIG. 1A is a perspective view of a throwaway tip according to one embodiment of the present invention as seen from the front side thereof.

As a result, the inventors have come up with an idea that a step gap between the first rake face 13a and the second bearing face 1c on the side of the inner cutting edge 11 is spanned with the first curved surface 15 for guiding the chips as set forth in claim 1 (FIG. 1A).

With the arrangement according to claim 1, the chips of the complicated three-dimensional shape can more smoothly and continuously be ejected from the hole through the flute of the holder than in the prior art while being guided by the first curved surface. This makes it possible to further increase the rotation speed of the drill and, hence, to increase the drilling rate.

In accordance with an inventive aspect of claim 2, the throwaway tip according to claim 1 is characterized in that the first curved surface has a curvature radius which is 7 to 15% of a drilling diameter of the tip.

If the curvature radius of the first curved surface is smaller than 7%, the curvature radius is so small that the chips generated by cutting the workpiece with the inner cutting edge are liable to be broken on the first curved surface. Hence, there is a possibility that the effect of the provision of the first curved surface cannot satisfactorily be provided for continuously and smoothly guiding and ejecting the chips generated on the side of the inner cutting edge without discontinuity. If the curvature radius is greater than 15%, the chip ejection space provided by locating the first rake face at the lower level than the second bearing face is narrowed. Hence, there is a possibility that the effect of the provision of the first curved surface cannot satisfactorily be provided for continuously and smoothly guiding and ejecting the chips generated on the side of the inner cutting edge.

In accordance with an inventive aspect of claim 3, the throwaway tip according to claim 1 is characterized in that the second rake face is located at a lower level than the first bearing face on the other side of the tip, and connected to the first bearing face by a step face including a second curved surface.

The arrangement according to claim 3 makes it possible to relieve a stress which may otherwise be concentrated on a corner edge of the step between the second rake face and the first bearing face on the side of the outer cutting edge which is subjected to a greater cutting resistance due to a greater circumferential speed than the inner cutting edge. Thus, the throwaway tip has an improved strength.

In accordance with an inventive aspect of claim 4, the throwaway tip according to claim 3 is characterized in that the first curved surface has a greater curvature radius than the second curved surface.

The arrangement according to claim 4 further facilitates the chip ejection on the side of the inner cutting edge. In addition, a greater space can be provided on the side of the outer cutting edge for the chip ejection by the step between the second rake face and the first bearing face, thereby facilitating the chip ejection on the side of the outer cutting edge.

In accordance with an inventive aspect of claim 5, the throwaway tip according to claim 3 is characterized in that the second curved surface has a curvature radius which is 5 to 7% of the drilling diameter of the tip.

If the curvature radius of the second curved surface is smaller than 5%, there is a possibility of failing to satisfactorily provide the effect of relieving the stress concentrated on the corner edge of the step for the improvement of the tip strength. If the curvature radius is greater than 7%, the chip ejection space provided by locating the second rake face at the lower level than the first bearing face is narrowed. Hence, there is a possibility of interfering with the chip ejection on the side of the outer cutting edge.

In accordance with an inventive aspect of claim 6, the throwaway tip according to claim 1 is characterized in that the first rake face has a first breaker concavity.

The arrangement according to claim 6 makes it possible to neatly curl the chips generated by cutting the workpiece with the inner cutting edge along a bottom face of the first breaker concavity. This allows the chips of the complicated shape generated on the side of the inner cutting edge to smoothly grow without discontinuity, thereby further facilitating the chip ejection.

In accordance with an inventive aspect of claim 7, the throwaway tip according to claim 6 is characterized in that the first curved surface is raised from the first breaker concavity forwardly with respect to a chip ejecting direction.

With the arrangement according to claim 7, the combination of the first breaker concavity and the first curved surface allows the chips generated by cutting the workpiece with the inner cutting edge to be neatly curled along the bottom face of the first breaker concavity and to be smoothly guided and ejected along the first curved surface. This further facilitates the chip ejection.

In accordance with an inventive aspect of claim 8, the throwaway tip according to claim 6 is characterized in that the first breaker concavity has a width, as measured in the drilling direction, which is 15 to 25% of the drilling diameter of the tip.

If the width of the first breaker concavity is smaller than 15%, the chips generated by cutting the workpiece with the inner cutting edge are liable to be broken when the chips are curled along the bottom face of the first breaker concavity. On the contrary, if the width is greater than 25%, the curled chips each have an excessively great curvature radius. In either of the cases, there is a possibility that the chips cannot be neatly curled to be smoothly ejected.

In accordance with an inventive aspect of claim 9, the throwaway tip according to claim 6 is characterized in that the second rake face has a second breaker concavity, and the first breaker concavity has a greater width as measured in the drilling direction than the second breaker concavity.

The arrangement according to claim 9 can further enhance the effect provided by the arrangement according to claim 6. In addition, the strip-shaped chips generated by cutting the workpiece with the outer cutting edge are bent at acute angles along a bottom face of the second breaker concavity so as to be finely broken for easier ejection thereof.

In accordance with an inventive aspect of claim 1, the throwaway tip according to claim 9 is characterized in that the second breaker concavity has a width, as measured in the drilling direction, which is 5 to 15% of the drilling diameter of the tip.

If the width of the second breaker concavity is smaller than 5% or greater than 15%, there is a possibility that the effect provided by the arrangement according to claim 9 cannot be ensured. That is, the chips generated by cutting the workpiece with the outer cutting edge cannot be finely broken by the second breaker concavity. This may make the chip ejection less easy.

In accordance with an inventive aspect of claim 11, there is provided a drill holder adapted to hold a throwaway tip at a front end thereof for drilling a hole, the drill holder comprising: a pair of holder pieces provided at the front end of the holder for holding the tip therebetween; a pocket for receiving the tip inserted therein between the holder pieces; and a pair of helical flutes provided on an outer circumferential surface of the holder for ejecting chips generated by cutting a workpiece with inner and outer cutting edges of the tip inserted in the pocket from the hole; wherein a connection surface extending from one of the helical flutes to reach a first rake face of the tip on the side of the inner cutting edge is inclined along an inclination of the one helical flute.

The arrangement according to claim 11 makes it possible to smoothly eject the chips of the complicated three-dimensional shape generated on the side of the inner cutting edge from the first rake face of the tip through the inclined connection surface into the flute. This further facilitates the chip ejection.

DESCRIPTION OF PREFERRED EMBODIMENTS

Figure 1B:
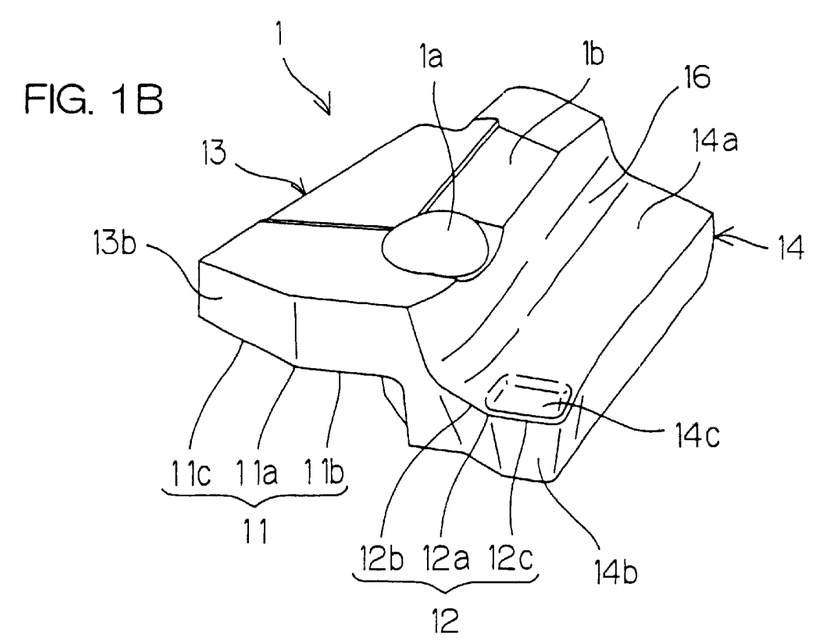
FIG. 1B is a perspective view of the throwaway tip as seen from the rear side thereof.
Figure 2A:
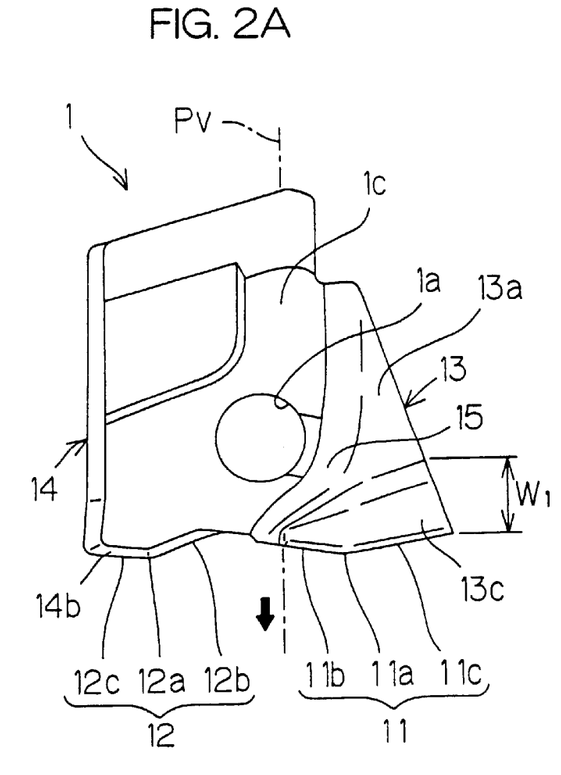
FIG. 2A is a front view of the tip.
Figure 2B:
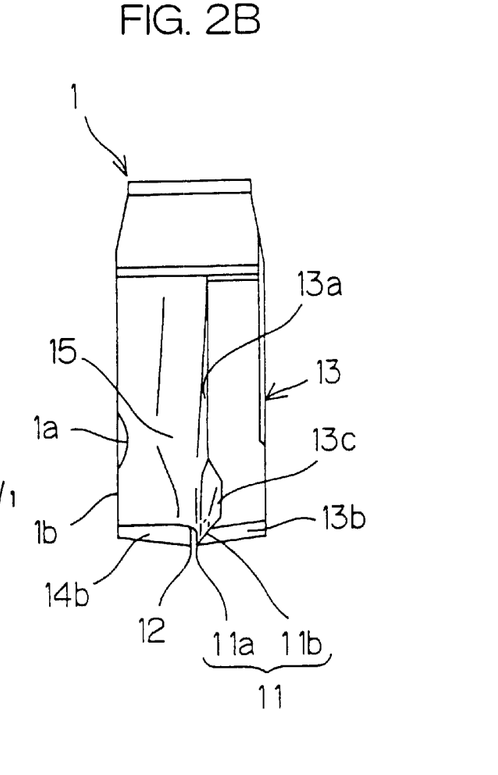
FIG. 2B is a right side view of the tip.
Figure 5A:
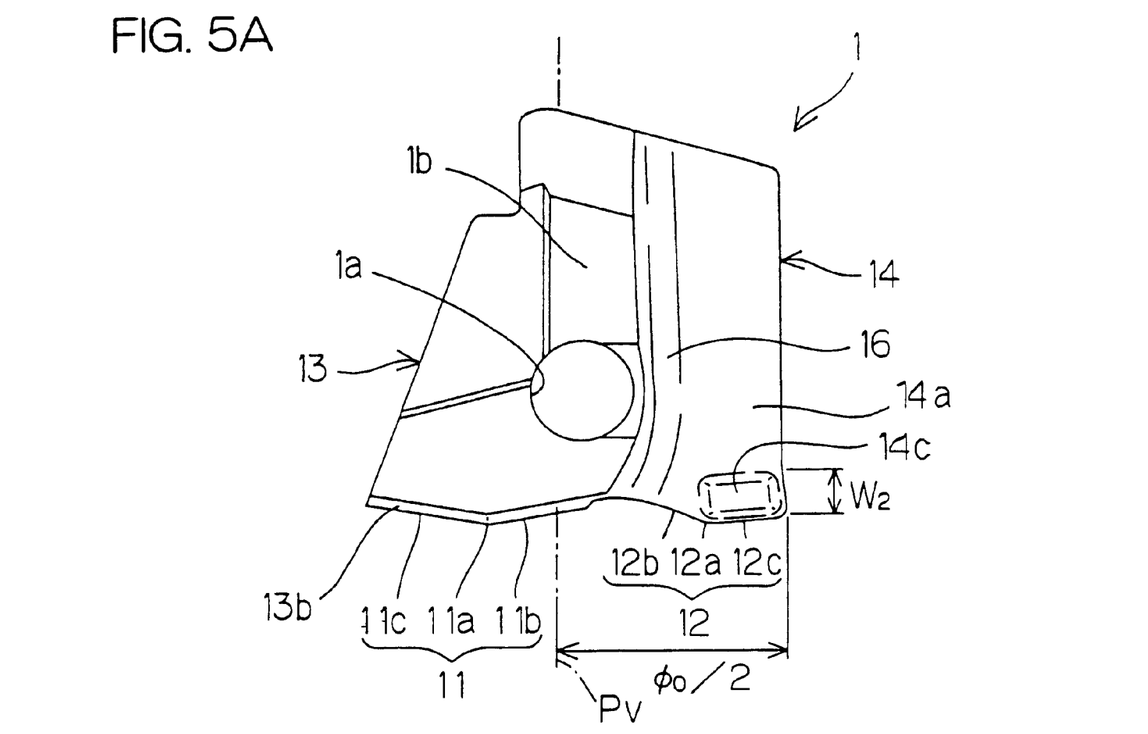
FIG. 5A is a rear view of the tip.
Figure 5B:
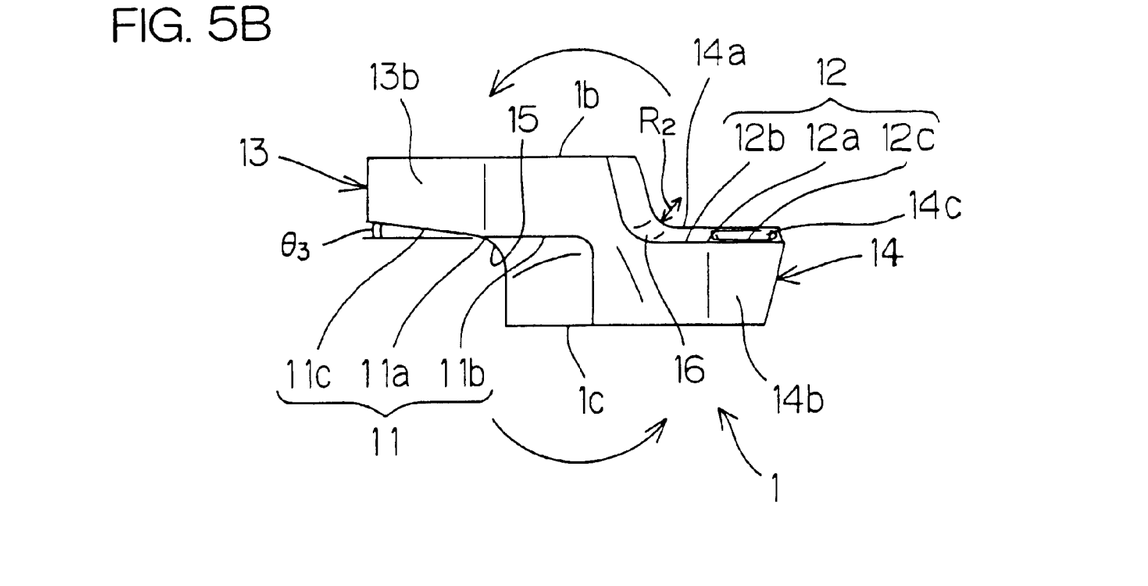
FIG. 5B is a bottom view illustrating the front end of the tip facing in the drilling direction.

FIGS. 1A and 1B are perspective views of a throwaway tip 1 according to one embodiment of the present invention as seen from the front side thereof and from the rear side thereof, respectively. FIGS. 2A and 2B are a front view and a right side view, respectively, of the tip 1. FIG. 5A is a rear view of the tip 1, and FIG. 5B is a bottom view illustrating a front end of the tip facing in a drilling direction.

As shown in these figures, the tip 1 according to this embodiment has two faces, i.e., a first bearing face 1b and a second bearing face 1c, disposed in a back-to-back relation for attachment of the tip to a holder.

The tip 1 is formed with a through-hole 1a which extends from the first bearing face 1b to the second bearing face 1c for receiving a screw inserted therein for the attachment of the tip to the holder.

Further, an inner cutting edge 11 for cutting a center area of a hole being drilled and an outer cutting edge 12 for cutting a circumference area of the hole are provided at a front end of the tip 1 as seen in the drilling direction indicated by a black arrow in FIG. 2A as crossing the drilling direction.

In a region adjacent to the second bearing face 1c (a right-hand region with respect to the rotation axis Pv in FIG. 2A) which serves as a rotation front when the tip 1 is rotated in a direction indicated by a solid line arrow in FIG. 5B about a rotation axis Pv extending in the drilling direction, a first rake face 13a is provided as a step at a lower level than the second bearing face 1c with respect to the direction of the rotation of the tip. By thus providing the first rake face 13a, a projection 13 of the tip 1 has a smaller thickness than a portion of the tip formed with the through-hole 1a. A first front flank 13b is provided at a front end of the projection 13, as seen in the drilling direction, which intersects the first rake face 13a and the first bearing face 1b provided in a back-to-back relation. The inner cutting edge 11 is defined as a ridge by an intersection between the first front flank 13b and the first rake face 13a.

Similarly, a second rake face 14a is provided as a step at a lower level than the first bearing face 1b with respect to the rotation direction of the tip in a region adjacent to the first bearing face 1b (a right-hand region with respect to the rotation axis Pv in FIG. 5A) which serves as a rotation front. By thus providing the second rake face 14a, a projection 14 of the tip 1 has a smaller thickness than a portion of the tip formed with the through-hole 1a. A second front flank 14b is provided at a front end of the projection 14, as seen in the drilling direction, which intersects the second rake face 14a and the second bearing face 1c provided in a back-to-back relation. The outer cutting edge 12 is defined as a ridge by an intersection between the second front flank 14b and the second rake face 14a.

A space provided forwardly of the first rake face 13a with respect to the rotation direction of the tip 1 by the provision of the step serves as a space (a chip pocket indicated by a reference character S1 in FIG. 4B) through which chips (indicated by reference character K in FIGS. 3A, 3B and 4A) generated on the side of the inner cutting edge 11 are ejected between the first rake face 13a and the holder 2. Similarly, a space provided forwardly of the second rake face 14a with respect to the rotation direction of the tip 1 by the provision of the step serves as a space (a chip pocket indicated by a reference character S2 in FIG. 4B) through which chips generated on the side of the outer cutting edge 12 are ejected between the second rake face 14a and the holder 2.

The inner cutting edge 11 has an apex 11a facing in the drilling direction, and cutting ridges 11b, 11c respectively extending inwardly and outwardly of the tip 1 from the apex 11a as being downwardly inclined. On the other hand, the outer cutting edge 12 has an apex 12a facing in the drilling direction, and cutting ridges 12b, 12c respectively extending inwardly and outwardly of the tip 1 from the apex 12a as being downwardly inclined. The inner cutting edge 11 and the outer cutting edge 12 are disposed with the apexes 11a and 12a thereof located at substantially the same level with respect to the drilling direction so as to simultaneously cut a center area by the inner cutting edge 11 and a circumference area by the outer cutting edge 12, respectively, of the hole for smooth drilling. Further, the inner cutting edge 11 and the outer cutting edge 12 are disposed in such a relation that, when the tip 1 is rotated about the rotation axis Pv, loci traced by the cutting ridge 11c of the inner cutting edge 11 and the cutting ridge 12b of the outer cutting edge 12 intersect each other.

The first rake face 13a and the second bearing face 1c are connected to each other by a first curved surface 15 having an inwardly curved shape for guiding the chips K generated by the cutting with the inner cutting edge 11.

Figure 3A:
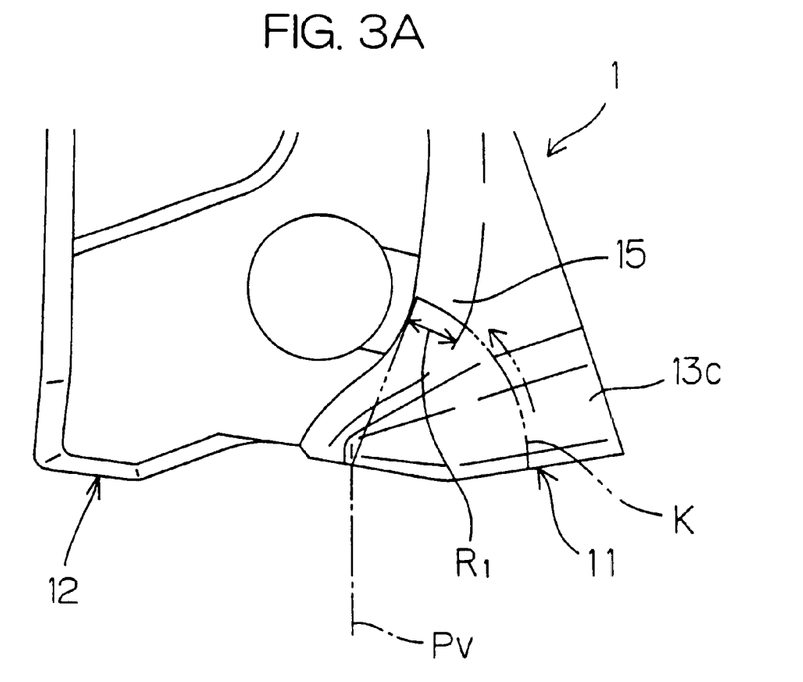
FIG. 3A is a front view illustrating a major portion of FIG. 2A on a greater scale.
Figure 3B:
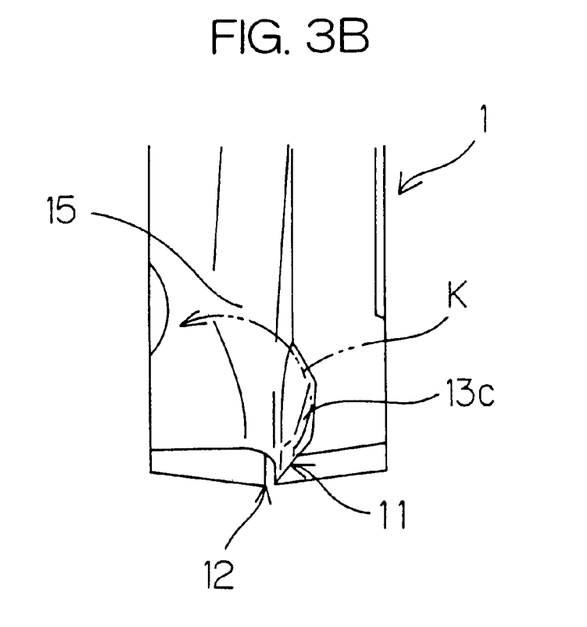
FIG. 3B is a right side view illustrating a major portion of FIG. 2B on a greater scale.

More specifically, the first rake face 13a has a first breaker concavity 13c, so that the first curved surface 15 is raised from the first breaker concavity 13c forwardly with respect to the direction of ejection of the chips K (indicated by two-dot-and-dash line arrows in FIGS. 3A and 3B).

With this arrangement, the chips K generated by cutting the workpiece with the inner cutting edge 11 can continuously and smoothly be ejected without discontinuity by the combination of the first breaker concavity 13c and the first curved surface 15. That is, the chips K are neatly curled along a bottom face of the first breaker concavity 13c as indicated by the two-dot-and-dash line arrows, and guided by the first curved surface 15 thereby to be continuously ejected as indicated by the solid line arrow in FIG. 4A.

Since a step gap present on the side of the inner cutting edge 11 is spanned with the first curved surface 15, a stress which may otherwise be concentrated on a corner edge of the step can be relieved for improvement of the strength of the tip 1.

The second rake face 14a and the first bearing face 1b are connected by a step face including a second curved surface 16 having an inwardly curved shape. Thus, a stress can be relieved which may otherwise be concentrated on a corner edge of the step present on the side of the outer cutting edge 12 which is subjected to a greater cutting resistance due to a greater circumferential speed than the inner cutting edge 11. This improves the strength of the tip 1.

The first curved surface 15 has a curvature radius which gradually increases from the front end toward the rear side of the tip 1 with respect to the drilling direction. A portion of the first curved surface 15 which actually serves to guide the chips K, i.e., a portion of the first curved surface 15 which is brought into circumferential contact with a conical chip K with its apex located on an intersection between the rotation axis Pv and the inner cutting edge 11 as indicated by the two-dot-and-dash lines in FIG. 3A, has a curvature radius $R_1$ which is greater than the curvature radius $R_2$ of the second curved surface 16 adjacent to a flat portion of the second rake face 14a as shown in FIG. 5B ($R_1 > R_2$).

This arrangement further facilitates the chip ejection on the side of the inner cutting edge 11. At the same time, the chip ejection on the side of the outer cutting edge 12 is also facilitated because the space S2 provided on the side of the outer cutting edge 12 for the chip ejection has a greater size.

If the condition of $R_1 > R_2$ is satisfied, the ranges of the curvature radii $R_1$ and $R_2$ are not particularly limited.

However, the curvature radius $R_1$ of the first curved surface 15 is preferably about 7 to 15% of a predetermined drilling diameter $\phi_0$ (a drilling radius $\phi_0/2$ is shown in FIG. 5A). This is based on the ground described above. In order to prevent breakage of the chips K for easier chip ejection, the curvature radius $R_1$ is preferably not smaller than 10% of the drilling diameter $\phi_0$. In order to increase the size of the chip ejection space S1 for easier ejection of the chips K, the curvature radius $R_1$ is preferably not greater than 12% of the drilling diameter $\phi_0$.

The curvature radius $R_2$ of the second curved surface 16 is preferably about 5 to 7% of the predetermined drilling diameter $\phi_0$. This is also based on the ground described above.

The second rake face 14a has a second breaker concavity 14c provided just behind the outer cutting edge 12 for finely segmenting strip-shaped chips generated by the cutting with the outer cutting edge 12. The width ($W_1$ in FIG. 2A) of the first breaker concavity 13c measured in the drilling direction is greater than the width ($W_2$ in FIG. 5A) of the second breaker concavity 14c measured in the drilling direction ($W_1 > W_2$). This further facilitates the chip ejection on the side of the inner cutting edge 11 as well as on the side of the outer cutting edge 12.

If the condition of $W_1 > W_2$ is satisfied, the ranges of the widths $W_1$ and $W_2$ are not particularly limited.

However, the width $W_1$ of the first breaker concavity 13c is preferably about 15 to 25% of the drilling diameter $\phi_0$. This is based on the ground described above. In order to neatly curl the chips K generated by cutting the workpiece with the inner cutting edge 11 and smoothly eject the chips, the width $W_1$ is preferably 19 to 22% of the drilling diameter $\phi_0$.

The width $W_2$ of the second breaker concavity 14c is preferably about 5 to 15% of the drilling diameter $\phi_0$. This is also based on the ground described above. In order to finely segment the chips generated by cutting the workpiece with the outer cutting edge 12 for the smooth chip ejection, the width $W_2$ is preferably 8 to 12% of the drilling diameter $\phi_0$.

In this embodiment, the cutting ridge 11c of the inner cutting edge 11 outwardly extending and the first rake face 13a extending from the cutting ridge 11c are bent and inclined at an angle θ₃ with respect to the cutting ridge 11b rearwardly of the rotation direction of the tip 1 as shown in FIG. 5B.

This arrangement increases the size of the chip ejection space S1 provided forwardly of the first rake face 13a and, therefore, is advantageous in that the chips K can be more smoothly curled in the space S1 and more smoothly ejected along the rearward inclination of the first rake face 13a into the flute of the holder 2.

Further, the arrangement described above increases a component force exerted in such a direction as to urge the tip 1 toward the side of the outer cutting edge 12 by the cutting resistance generated during the drilling and, therefore, is advantageous in that the drilling diameter can be maintained at a predetermined value by overcoming a component force exerted in such a direction as to radially inwardly urge the outer cutting edge 12 by the cutting resistance.

Figure 4B:
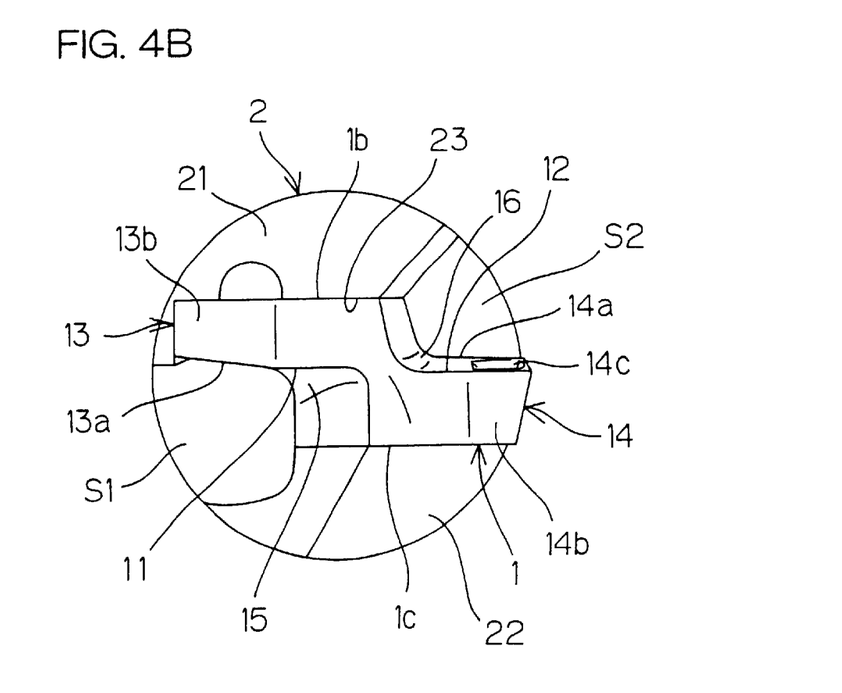
FIG. 4B is a bottom view illustrating the state of the tip attached to a front end of a holder as seen from the side of the front end facing in a drilling direction.
Figure 6A:
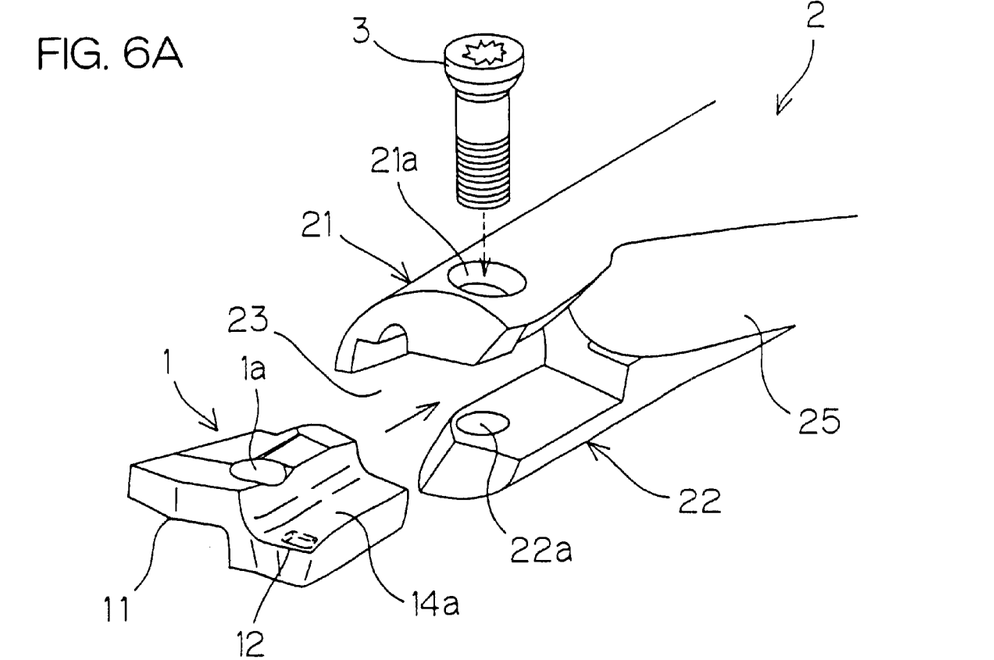
FIG. 6A is an exploded perspective view illustrating a structure for attaching the tip to the front end of the holder as seen from the rear side of the tip.
Figure 6B:
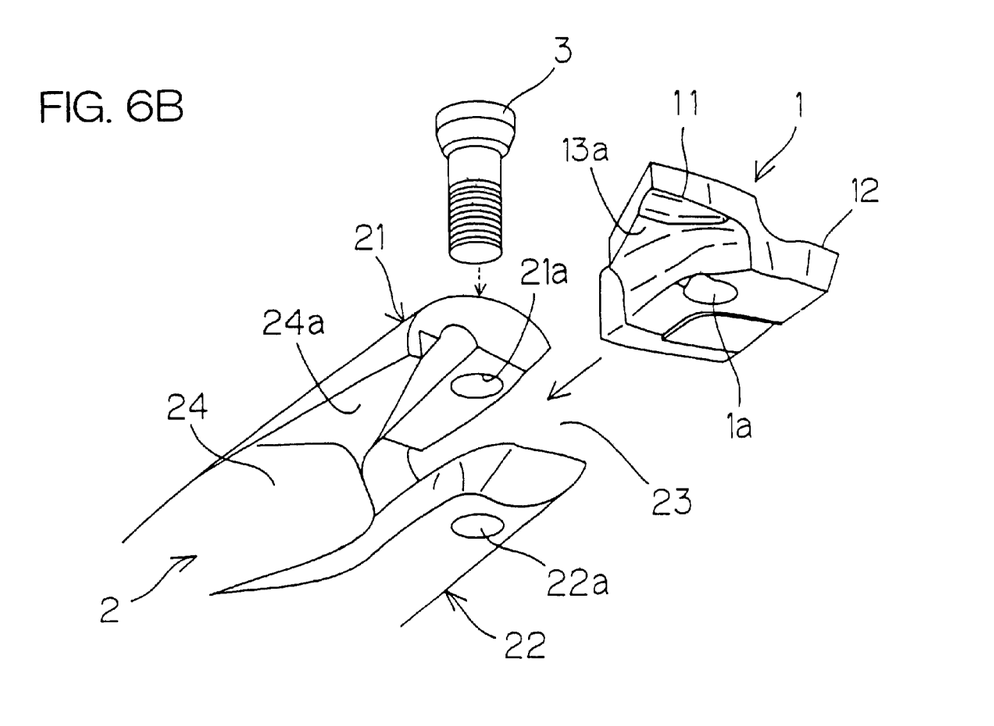
FIG. 6B is an exploded perspective view illustrating the attachment structure as seen from the front side.

The tip 1 of this embodiment is inserted into a pocket 23 between a pair of holder pieces 21 and 22 provided at a front end of the drill holder 2 for positioning thereof as shown by solid line arrows in FIGS. 6A and 6B. In this state, a screw 3 is inserted into a through-hole 21a of the holder piece 21 and the through-hole 1a of the tip 1, and brought into threading engagement with a threaded hole 22a of the holder piece 22. Thus, the tip is fixed to the front end of the holder 2 as shown in FIG. 4B so as to be used for drilling.

With the tip fixed in this state, the chip ejection spaces S1 and S2 respectively defined between the first rake face 13a and the holder piece 22 and between the second rake face 14a and the holder piece 21 are respectively brought into communication with helical flutes 24 and 25 formed in a circumference of the holder 2. Thus, the chips generated on the side of the inner cutting edge 11 and on the side of the outer cutting edge 12 are smoothly ejected from the hole through the flutes 24 and 25, respectively.

Figure 7A:
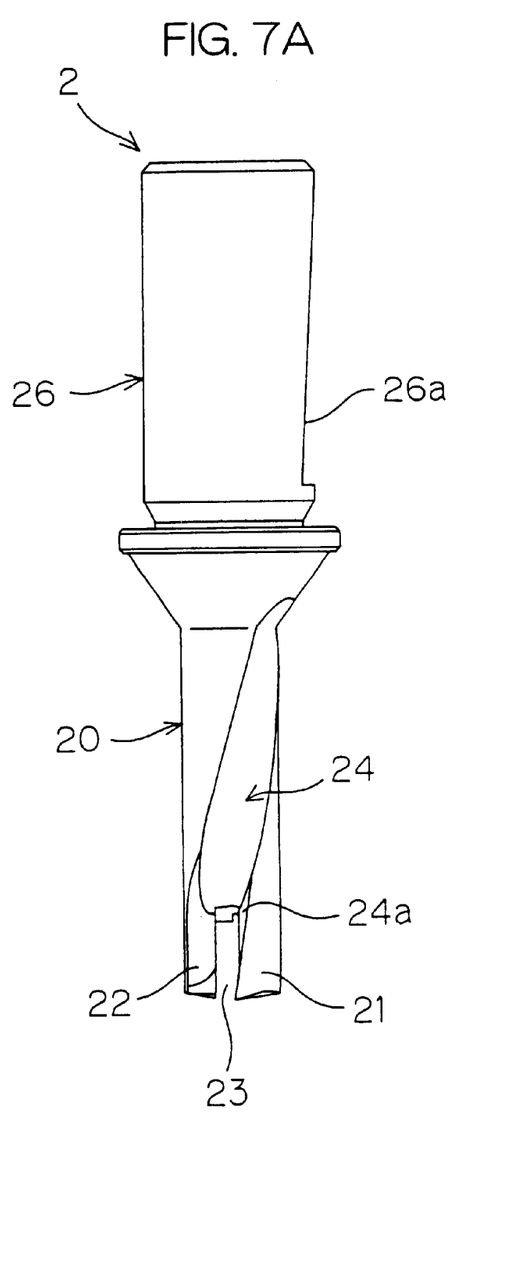
FIG. 7A is a front view of a drill holder according to one embodiment of the present invention.
Figure 7B:
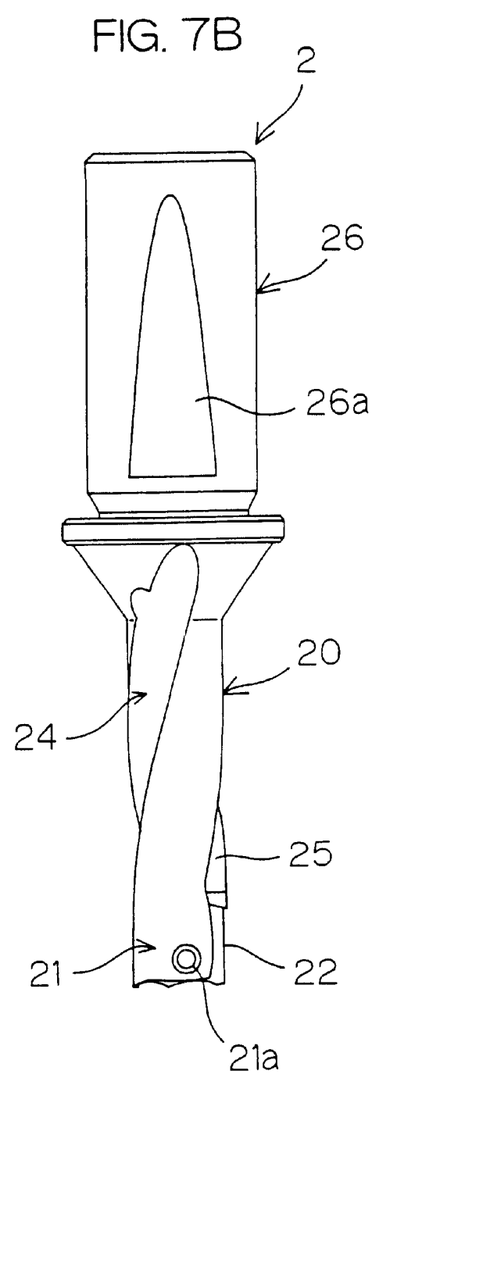
FIG. 7B is a side view of the drill holder.

As shown in FIGS. 6B and 7B, a connection surface 24a extending from the flute 24 to reach the first rake face 13a of the tip 1 is inclined along the inclination of the helical flute 24. Thus, the chips K of the complicated three-dimensional shape generated on the side of the inner cutting edge 11 can smoothly be ejected from the tip 1 into the flute 24.

In FIGS. 7A and 7B, a reference character 20 denotes a drill body which has the holder pieces 21, 22 and the pocket 23 at its front end, and the helical flutes 24, 25 in its circumference. A reference character 26 denotes a shank formed coaxially and integrally with the drill body 20 to be held by a chuck such as of a machine tool, and a reference character 26a denotes a flat portion provided as a detent on a lateral side of the shank.

It should be understood that the throwaway tip and the drill holder according to the present invention be not limited to those explained hereinbefore with reference to the drawings, but design modifications may be made thereto as required without departing from the spirit and scope of the present invention. For example, the drill holder of the present invention is advantageously employed as a drill holder not only for the throwaway tip of the present invention but also for a throwaway tip of single tip type having a similar construction to a throwaway tip of double tip type.

What is claimed is:

1. A throwaway tip for drilling a hole, comprising:
   an inner cutting edge provided at a front end of a drilling direction of the tip for cutting a center area of the hole;
   an outer cutting edge provided at the front end of the tip for cutting a circumference area of the hole;
   a first rake face provided on one side of the tip;
   a first bearing face provided on the other side of the tip in a back-to-back relation with the first rake face;
   a first front flank provided on the front end of the tip as intersecting the first rake face and the first bearing face;
   the inner cutting edge being defined as a ridge by an intersection between the first rake face and the first front flank and extending as crossing the drilling direction;
   a second rake face provided on the other side of the tip;
   a second bearing face provided on the one side of the tip in a back-to-back relation with the second rake face; and
   a second front flank provided on the front end as intersecting the second rake face and the second bearing face;
   the outer cutting edge being defined as a ridge by an intersection between the second rake face and the second front flank and extending as crossing the drilling direction;
   the first rake face being located at a lower level than the second bearing face on one side of the tip, and connected to the second bearing face by a first curved surface for guiding chips generated by cutting with the inner cutting edge.

2. A throwaway tip as set forth in claim 1, wherein the first curved surface has a curvature radius which is 7 to 15% of a drilling diameter of the tip.

3. A throwaway tip as set forth in claim 1, wherein the second rake face is located at a lower level than the first bearing face on the other side of the tip, and connected to the first bearing face by a step face including a second curved surface.

4. A throwaway tip as set forth in claim 3, wherein the first curved surface has a greater curvature radius than the second curved surface.

5. A throwaway tip as set forth in claim 3, wherein the second curved surface has a curvature radius which is 5 to 7% of a drilling diameter of the tip.

6. A throwaway tip as set forth in claim 1, wherein the first rake face has a first breaker concavity.

7. A throwaway tip as set forth in claim 6, wherein the first curved surface is raised from the first breaker concavity forwardly with respect to a chip ejecting direction.

8. A throwaway tip as set forth in claim 6, wherein the first breaker concavity has a width, as measured in the drilling direction, which is 15 to 25% of a drilling diameter of the tip.

9. A throwaway tip as set forth in claim 6, wherein the second rake face has a second breaker concavity, and the first breaker concavity has a greater width as measured in the drilling direction than the second breaker concavity.

10. A throwaway tip as set forth in claim 9, wherein the second breaker concavity has a width, as measured in the drilling direction, which is 5 to 15% of a drilling diameter of the tip.

11. A drill holder adapted to hold a throwaway tip at a front end thereof for drilling a hole, the drill holder comprising:
   a pair of holder pieces provided at the front end of the holder for holding the tip therebetween;
   a pocket for receiving the tip inserted therein between the holder pieces; and
   a pair of helical flutes provided in an outer circumferential surface of the holder for ejecting chips generated by cutting a workpiece with inner and outer cutting edges of the tip inserted in the pocket from the hole;

wherein a connection surface extending from one of the helical flutes to reach a first rake face of the tip on the side of the inner cutting edge is inclined along an inclination of the one helical flute.

* * * * *